(12) United States Patent
Lapp et al.

(10) Patent No.: US 8,478,997 B2
(45) Date of Patent: Jul. 2, 2013

(54) MULTI-LEVEL SECURITY SOFTWARE ARCHITECTURE

(75) Inventors: Douglas Edward Lapp, Yorba Linda, CA (US); Thomas Robert Woodall, Valencia, CA (US)

(73) Assignee: Raytheon Company, Waltham, MA (US)

( * ) Notice: Subject to any disclaimer, the term of this patent is extended or adjusted under 35 U.S.C. 154(b) by 265 days.

(21) Appl. No.: 12/879,800

(22) Filed: Sep. 10, 2010

(65) Prior Publication Data

US 2012/0066509 A1 Mar. 15, 2012

(51) Int. Cl.
*H04L 29/06* (2006.01)
(52) U.S. Cl.
USPC ............................ 713/166; 713/153; 713/160
(58) Field of Classification Search
USPC .......................................... 713/166, 153, 160
See application file for complete search history.

(56) References Cited

U.S. PATENT DOCUMENTS

| 5,893,911 | A  | * | 4/1999  | Piskiel et al. | 707/694 |
| 7,607,032 | B1 | * | 10/2009 | Marek et al.   | 713/300 |
| 2009/0034734 | A1 | * | 2/2009 | Owens et al.  | 380/277 |

* cited by examiner

*Primary Examiner* — Andrew Georgandellis
(74) *Attorney, Agent, or Firm* — Christie, Parker & Hale, LLP

(57) ABSTRACT

A multi-level security software architecture includes various components configured to provide full data separation across multiple processors while limiting the number and size of high assurance components. The architecture includes a domain separator for ensuring that messages exchanged between domains that are distributed on different microprocessors are securely routed between domain members. The domain separator verifies a message label including a domain identifier provided by a domain gateway and cryptographically binds the message label to each message via cryptographic keys. This prevents misrouting messages caused by accidental or malicious corruption of message labels. Additionally, the domain separator can encrypt messages as necessary to enforce data separation on shared network buses. The domain separator is also responsible for managing the cryptographic keys used to label or encrypt messages.

17 Claims, 5 Drawing Sheets

MULTI-LEVEL SECURITY SOFTWARE ARCHITECTURE

BACKGROUND

Evaluation Assurance Level (EAL1 through EAL7) of an IT product or system is a numerical grade assigned following the completion of a security evaluation. Computer products are often required to achieve a particular assurance level certification in order to be sold to the government.

Higher assurance levels reflect added assurance requirements that must be met to achieve a particular certification. The general intent of the higher levels is to provide higher confidence that the system's principal security features are reliably implemented. The EAL level does not measure the security of the system itself, it simply states at what level the system was tested.

To achieve a particular EAL, the computer system must generally meet specific assurance requirements. Most of these requirements involve design documentation, design analysis, functional testing, or penetration testing. The higher EALs involve more detailed documentation, analysis, and testing than the lower ones. Achieving a higher EAL certification therefore generally costs more money and takes more time than achieving a lower one. Virtually all currently available embedded avionics systems operate at a system high classification protocol, meaning that all data residing on the system must be treated as if classified at the aggregate classification level of all system resident data. This negatively impacts system performance by restricting and/or delaying data sharing with other networked systems—a constraint that directly conflicts with the goal of improved information sharing. Operating at system high also increases total system cost of ownership by requiring system operators to clear all personnel that touch the system to the aggregate classification of all hosted data.

In an attempt to address this deficiency in the prior art, multiple independent levels of security (MILS) operating systems known as separation kernels (SK) have been developed to provide full data separation and hence Multiple Levels of Security (MLS) operation which is a prerequisite to providing embedded airborne platform network connectivity. However, in such prior art systems, data separation is achieved between different virtual address spaces on a single processor, not across multiple processors typically found in an embedded avionics systems or multiple networked systems.

Accordingly, what is desired is a software architecture for use in embedded avionics systems that provides full data separation in the Multiple Independent Levels of Security (MILS) model across multiple processors, in a cost-effective manner.

SUMMARY OF THE INVENTION

According to one embodiment, the present invention is directed to a data processing apparatus adapted for transmitting messages classified at different security classification levels while maintaining data separation of the messages. The data processing apparatus includes a first processor having a first memory, a second processor having a second memory, and a communication bus coupled in-between the first processor and the second processor. The first memory includes program instructions for securely transmitting a message generated by a first application in the first processor to a second application in the second processor. The first processor executes the program instructions which include identifying a security classification level for the message; tagging an identifier representative of the identified security classification level to the message; selecting an encryption key based on the identified security classification level; encrypting at least a portion of the message based on the selected encryption key; and routing the encrypted message to the second processor via the communication bus. The second application in the second processor generates an output in response to the message.

According to one embodiment of the invention, the first and second processors each include a plurality of domains operating at different security classification levels. Each of the plurality of domains is associated with specific virtual address spaces in the memory of the corresponding processor. Each of the plurality of domains may include a domain gateway module with program instructions for preventing communication between virtual address spaces associated with different domains within the corresponding processor. The message is thus forwarded to the particular domain gateway module for the domain operating at the identified security classification level. The particular domain gateway module includes program instructions for tagging the identifier identifying the security classification level to the message. The tagged identifier identifies the domain operating at the identified security classification level.

According to one embodiment of the invention, the selecting of the encryption key and the encrypting of at least a portion of the message is by computer program instructions associated with a first domain separator module in the first processor, where a single domain separator module exists for each of the first and second processors.

According to one embodiment of the invention, the program instructions executed by the first processor further include determining that the second application is in the second processor, and forwarding the message by the particular domain gateway module to the first domain separator module.

According to one embodiment of the invention, the first domain separator module includes program instructions for verifying accuracy of the tagged identifier based on identification of the domain gateway from which the message is received.

According to one embodiment of the invention, the first domain separator module includes a table mapping identifiers to domain gateways. The first domain separator module further includes computer instructions for discarding the message if the tagged identifier does not match the identifier in the table for the domain gateway from which the message is received.

According to one embodiment of the invention, the message includes a header generated according to a first protocol associated with a specific communication middleware program. The computer instructions executed by the first processor further include converting the header to a common header generated according to a common messaging protocol associated with the first domain separator module.

According to one embodiment of the invention, the message includes a message type, and the computer program instructions executed by the first processor further comprise broadcasting the message to subscribers of the message type.

According to one embodiment of the invention, the security classification level for a message may be unclassified, secret, confidential, or top secret.

According to one embodiment of the invention, the second memory in the second processor includes program instructions that are executed by the second processor, the program instructions including receiving the encrypted message; retrieving the tagged identifier from the message; selecting a decryption key based on the retrieved identifier; decrypting the message based on the decryption key; and forwarding the message to the second application.

According to one embodiment of the invention, the message is routed to the second application while maintaining data separation with a second message also transmitted via the communication bus. The second message is classified at a security classification level different from the identified security classification level.

According to one embodiment of the invention, the program instructions executed by the first processor further include verifying routing information associated with the message for enforcing restrictions on data exchanged between the first and second applications.

According to one embodiment of the invention, the two applications operate according to a same security classification level.

These and other features, aspects and advantages of the present invention will be more fully understood when considered with respect to the following detailed description, appended claims, and accompanying drawings. Of course, the actual scope of the invention is defined by the appended claims.

DETAILED DESCRIPTION

The software architecture according to one embodiment of the present invention enables system designers to cost-effectively develop MLS embedded avionics systems. The architecture extends data separation across multiple processors, enabling system designers to create multi-processor avionics systems with true system MLS capability.

According to one embodiment, the architecture enables instantiating MLS data separation within a computing system using a confederation of small middleware modules, each designed to perform a specific, limited data separation function. This contrasts with current MLS architectures which rely on a large, monolithic software module to perform all data separation functions. Federation minimizes the number of lines of data separation code requiring high assurance, thus reducing the cost and risk associated with developing and evaluating MLS systems.

The architecture also abstracts data separation from the communications middleware. For example, instead of a designer being limited to a specific communications middleware, the architecture provides MLS data separation while allowing system designers to use the communication middleware method or methods best suited to their system, including using no communications middleware.

Understanding domains is useful to understanding architecture and data separation. A domain is a set of virtual address spaces operating at the same classification level that: 1) are distributed across multiple microprocessors within a computing system; and 2) exchange information. According to one embodiment, domain separation is defined as ensuring that only the members of a given system domain can access information belonging to that domain.

Separation kernels which are known in the art are designed to enforce data separation between multiple virtual address spaces executing on a single processor or processor core. One such separation kernel is marketed as Integrity 178B by Greenhills Software, Inc. of Santa Barbara Calif. Since the SK maintains separation between virtual address spaces, each address space is independent, allowing the address space to hold data classified at a different classification level, hence, achieving multiple independent levels of security (MILS) for that processor. Embodiments of the present invention extend the data separation provided by the separation kernel (SK) on a single microprocessor, to multiple domains that are distributed across a computing system comprised of multiple networked microprocessors.

Figure 1:
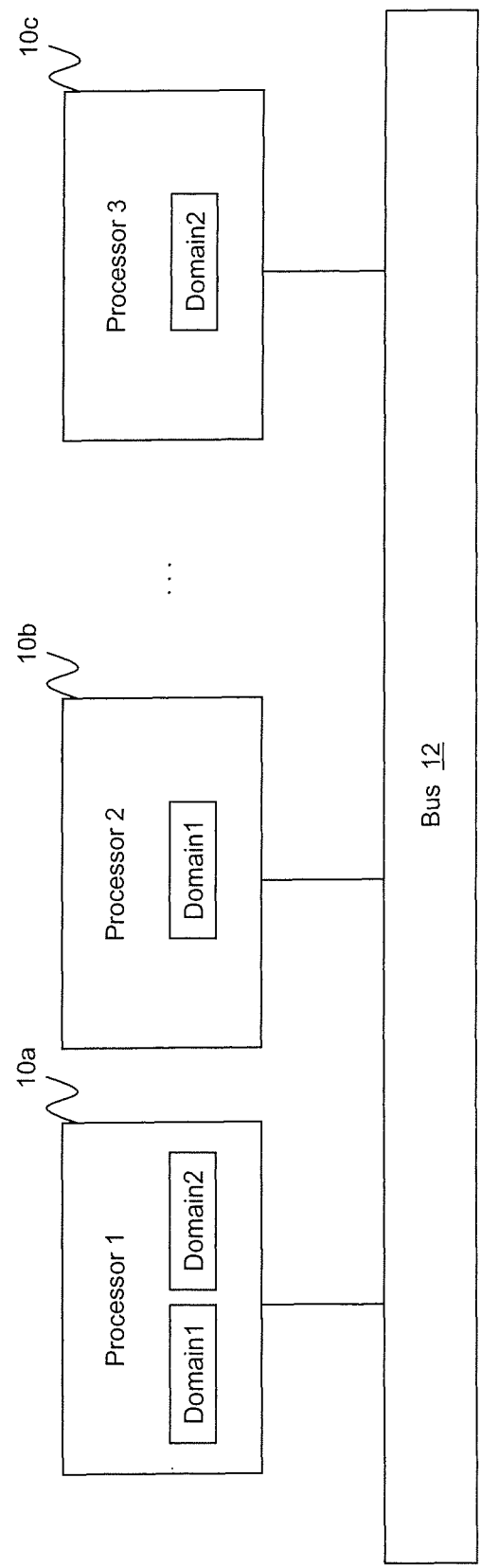
FIG. 1 is a schematic block diagram of a data processing apparatus according to one embodiment of the invention.

FIG. 1 is a schematic block diagram of a data processing apparatus in, for example, an avionics device, according to one embodiment of the invention. The apparatus includes multiple processors 10a-10c (collectively 10) communicating with one another over one or more local buses 12. The processors may be located on the same motherboard, on separate motherboards inserted into a chassis and connected by a back plane, or both. According to one embodiment of the invention, single processors are located on separate boards inserted into a multi-slot chassis. A back plane is a circuit board that routes signals between boards inserted into separate slots in a multi-slot chassis. The chassis slots connect each board to the backplane via edge connectors on each board that fit into the electrical connector that forms the base of the slot.

A domain may be distributed across one or more of the processors. For example, members of domain 1 may be distributed across processors 10a and 10b, and members of domain 2 may be distributed across processors 10a and 10c. Each of the processors 10a-10c which may be, for example, a multi-core microprocessor.

Each domain is associated with a range of virtual address spaces storing one or more computer applications which are deemed to be members of the domain. The virtual address space for each processor is associated with a physical memory (e.g. RAM, disk, etc.) storing a portion of the application. An exemplary application may be, for example, an on-board sensor application.

All computer applications of a particular domain operate at the same classification level. The various types of classification levels ranging from lowest to highest may be, for example, unclassified, confidential, secret, and top secret. Thus, a domain is a collection of applications sharing data that operate at the same classification level. A particular processor may host domains operating at all four classification labels.

As a person of skill in the art would understand, if all applications are operating at a single level, they do not typically require any assurance level. However, assurance is required for software typically employed in avionics systems that either operates on data at multiple classification levels or maintains separation between data at multiple classification levels. EAL levels (e.g. EAL1-EAL7) typically map to number of classification levels the software handles or separates. For example, separating a "top secret" classification and a "secret" classification usually only requires EAL 5. A top secret/secret/classified classification requires EAL 6, while a top secret/secret/classified/unclassified classification requires EAL 6+ or 7.

According to one embodiment, the data processing apparatus maintains separation of data generated by an application in a particular domain so that it is not available to another application in a different domain. Similarly two applications of the same domain but in different processors may securely share data with one another. In this regard, the bus 12 coupled to the processors 10 securely transports data from one processor to another.

Figure 2:
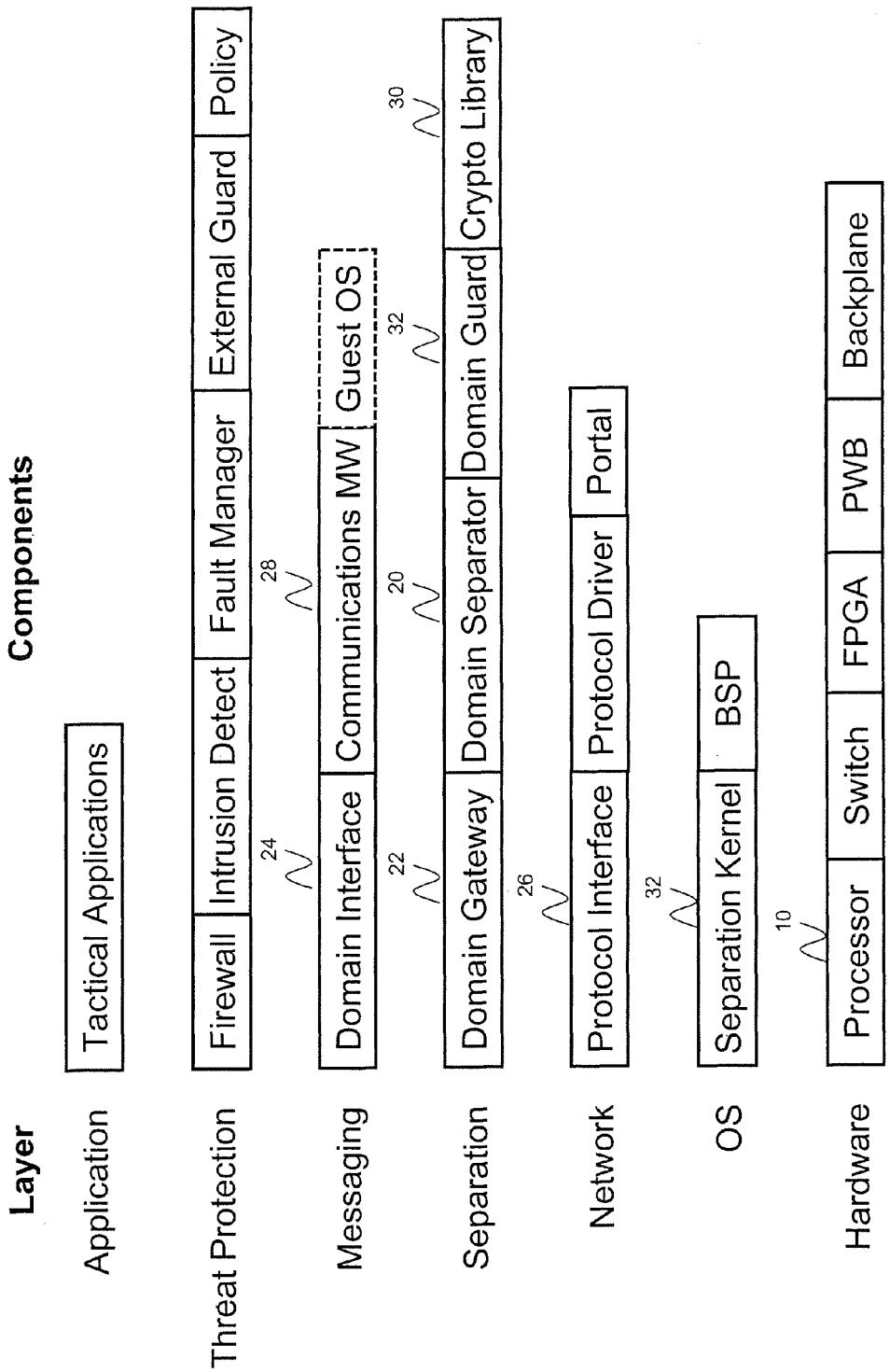
FIG. 2 is a multi-level security software architecture employed by each processor in the data processing apparatus of FIG. 1 according to one embodiment of the invention.

FIG. 2 is a multi-level security software architecture employed by each processor 10 according to one embodiment of the invention. According to one embodiment, the architecture provides an MLS system that minimizes the cost and overhead typically associated with such systems by: a) limiting the number and size of High Assurance components; b) supporting multiple data separation methods simultaneously, allowing system designers to select the method that best fits their applications performance needs; and c) supporting interfacing with unmodified legacy systems, reducing the cost of upgrading weapons systems to MLS operation. The architecture also abstracts inter-application communications, thus, supporting a wide range of real and near-real time avionics applications.

According to the embodiment of FIG. 2, the software architecture includes a domain separator 20, domain gateway 22, domain interface 24, and protocol interface 26 components. According to one embodiment, each of the components are software modules implemented via computer program instructions that are stored in a computer readable media such as, for example, the processor's memory. A person of skill in the art will recognize, however, that the full architecture will consist of many levels and components than the ones specifically mentioned herein.

According to one embodiment, multi-processor domain separation is enabled by the domain separator 20. According to one embodiment, one instantiation of the domain separator exists per microprocessor 10. One of its main functions is ensuring that messages exchanged between domains distributed on different microprocessors are securely routed between domain members. Thus, the domain separator 20 enforces domain data separation across microprocessors in a distributed computing system. According to one embodiment, the domain separation architecture uses two design elements to achieve this mission. First, all inbound/outbound message traffic to/from a processor pass through the domain separator. This rule is enforced by the separation kernel 32 by restricting the communications paths between virtual address spaces. Second, after verifying a message label attached to the message by the domain gateway 22 as is discussed below, the domain separator cryptographically binds the message label to each message via cryptographic keys provided by a cryptographic module 30. This prevents misrouting messages caused by accidental or malicious corruption of message labels. Additionally, the domain separator can encrypt messages as necessary to enforce data separation on shared network buses 12. The domain separator is also responsible for managing the cryptographic keys used to label or encrypt messages.

One key benefit of the domain separator 20 is that data separation occurs above the protocol stack, eliminating the need for high assurance or trusted hardware to maintain data separation during data transport between microprocessors. This greatly reduces software and hardware development and evaluation costs.

Another component for providing data separation is the domain gateway 22. A unique domain gateway is instantiated on each microprocessor 10 of each domain hosted by that processor. According to one embodiment, the program code for each domain gateway is identical, but the data artifacts defining the separation policy differs for each gateway.

According to one embodiment, the domain gateway 22 performs two primary and one optional data separation functions. First, the domain gateway securely routes messages between domain members residing on the same processor. In other words, all message traffic between members of a given domain residing on the same microprocessor passes through the owning domain gateway. This includes the routing of message traffic belonging to the same domain distributed across multiple cores in a multi-core processor.

Second, the domain gateway securely routes between each local domain and the domain separator 20. The gateway routes outbound messages sent from domain members on one microprocessor to domain members on another microprocessor in the computing system to the local domain separator. The domain gateway tags each such message with a label identifying its domain and/or classification level. As described above, the domain separator 20 then securely routes outbound messages to their destination processor. Conversely, each local domain separator delivers inbound messages to the local domain gateway of the destination domain member, which delivers the message to its intended recipient.

According to one embodiment, the domain gateway also supports type separation within a single domain. Type separation may be based on the type of messages capable of being transmitted from one application to another. Thus, applications in one domain may only be able to communicate certain types of data but not others, providing type separation within domains operating at the same classification level.

The domain interface 24 abstracts data separation middleware components from a communications middleware 28 (also referred to as a messaging layer or messaging-oriented middleware). The domain interface translates communications middleware specific routing information to a standardized format supported by the data separation middleware. This enables developing standardized domain gateways and domain separators independent of the communications middleware method, thus allowing system designers to select the communications middleware method or methods best suited to their system. This model allows supporting multiple methods simultaneously or applications to interface to the domain gateway through a thin wrapper when bypassing the communications middleware 28 is desirable or necessary. According to one embodiment, a separate domain interface module is used for each communications middleware method supported by a system. A unique instantiation of this interface is performed in every virtual address space using that communications middleware solution.

Lastly, the protocol interface module 26 isolates the domain separator 20 from the system data transport layer. All outbound message traffic is passed from the domain separator 20 to the protocol interface module 26, which then routes the message to the correct protocol stack, using the original routing information inserted by the domain interface 24. Conversely, all inbound traffic from all protocol stacks is received by the protocol interface module 26 and then passed to the domain separator 20. The domain separator 20 and protocol interface module 26 use a standardized messaging protocol for all messages, regardless of the processor to processor protocol used. Eliminating the need for the domain separator to handle a potentially wide range of communications protocols greatly simplifies the domain separator, again resulting in a small, less complex, easier to evaluate and certify software module, important elements in reducing the cost of a high assurance module.

Figure 3:
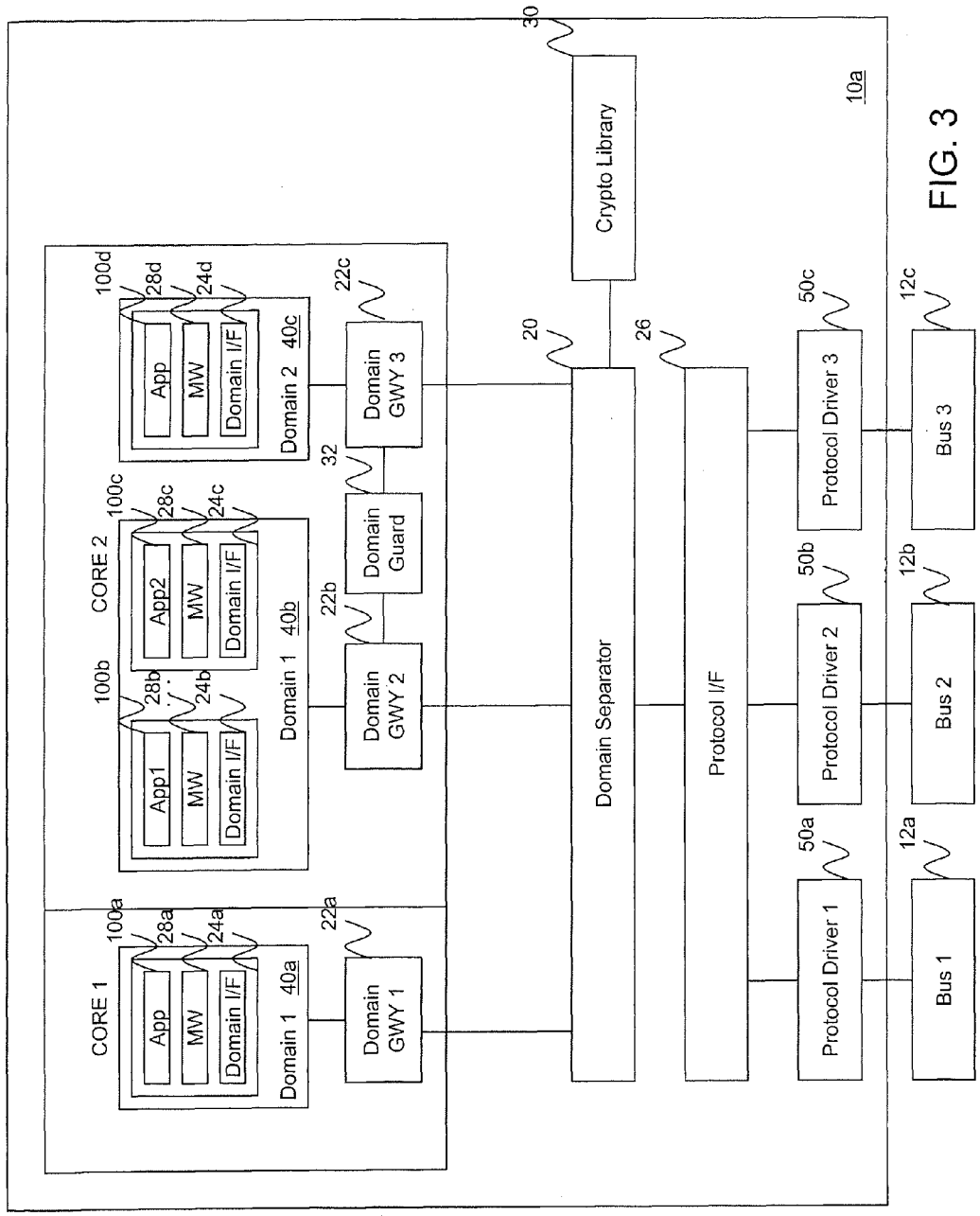
FIG. 3 is a conceptual layout diagram of various components of a multi-core processor employing the software architecture of FIG. 2 according to one embodiment of the invention.

FIG. 3 is a conceptual layout diagram of the various components of the multi-core processor 10a employing the software architecture of FIG. 2 according to one embodiment of the invention. The processor in the embodiment of FIG. 3 has two cores. Each core may include one or more domains 40a-40c (collectively 40). In the illustrated example, core 1 has a single domain 40a while core 2 has two domains 40b, 40c. Each domain 40a-40c may have a collection of applications 100a-100d (collectively 100) where each application communicates with other applications in the domain (whether in the same core, different core, or different processor) via the domain middleware 28a-28d and domain interface 24a-24d.

A domain gateway 22a-22c is instantiated for each domain per core. A domain guard 32 links any two domains in the processor for passing messages between the domains. In this regard, the domain guard includes a rules engine that verifies that the data in messages passing from one domain to another only contain data that the receiving domain can handle. Messages going from a higher to lower classification level (a write down) are scanned to ensure the message only contains data classified at the lower level. Messages going from a lower to higher classification level (a read up) are scanned to ensure that no malware or other invalid data that could compromise data at the higher level, are in the message. The system developer creates a set of rules for verifying messages; these rules are processed by the rules engine in the guard to parse the associated message. The rules define, for example, both the data fields and their allowable values for each message type.

According to one embodiment, each processor includes a single domain separator 20, crypto library 30, and protocol interface 26. The protocol interface 26 maps routing information in message headers to communication ports or protocol drivers 50a-50c (collectively 50). Each processor also includes a separate protocol driver 50a-50c for each data communications bus 12a-12c.

The multi-level security software architecture of FIG. 2 allows a product embodying such architecture to be evaluated and certified in a less expensive and risky manner than current MLS architectures. This is achieved, according to one embodiment, by separating the operations required to securely separate, route, and transmit data into multiple modules with distinct functions. Functions are allocated to modules based on the risk of data spills between domains resulting from a software failure. This risk is defined by: a) the levels of data separation handled by that module; and b) the possibility of a functional error in one function resulting in data misrouting at a subsequent function. The higher the risk, the higher assurance level required by each software module.

Since the domain and protocol interfaces according to the embodiment of FIG. 2 perform no data separation functions, only routing, neither requires more than low assurance. Since according to the embodiment of FIG. 2 each instantiation of a domain interface module only handles one level of security and only injects routing information in messages, not separation information, it only requires low assurance. While on the other hand, the protocol interface module 26 potentially handles data at all four classification levels, domain separation is enforced by the next higher level in the architecture, the domain separator 20. Thus, the protocol interface module 26 also only requires low assurance.

The domain gateway 22 according to the embodiment of FIG. 2 also only processes data at a single classification level, but does provide two domain separation functions. While it tags messages with a classification/domain label, the label is verified by the domain separator 20. The domain gateway 22 optionally provides type separation. These factors imply the need for medium separation.

The domain separator 20 is a true MLS software component which must potentially maintain separation between three levels of data since all inter-processor message traffic flows through the domain separator, and since any processor can host domains operating at all four classification levels. Hence, the domain separator requires high assurance evaluation and certification. However, the domain separator 20, the associated cryptographic module 30, and the separation kernel 32 are, according to one embodiment, the only MLS component requiring high assurance evaluation.

Thus, a person of skill in the art should recognize that the software architecture described herein limits the number, size, and complexity of high assurance software components which in turn should reduce system development, evaluation, and certification costs and risks. The software, if used in a embedded processors used in airborne platforms, should allow such platforms to be networked to sources of information at various classification levels. The software should also allow military aircraft to maintain separation of classified data generated by its on-board sensor subsystems. This is a capability that has been long sought after, but not achievable due to, for example, certification issues and implementation cost and technical issues. The MILS architecture described herein provides data separation with no direct additional cost to the processor system. It also allows for ease of certification and future re-certification. The architecture is very flexible in that it can support a very wide range of potential weapon system applications as well as applications outside of the military.

According to one embodiment, the software architecture according to the described embodiments use a publish/subscribe communications model as will be understood by a person of skill in the art. Each publisher (applications that originate messages) informs the local communication middleware agent of the "topics" it will publish. Each subscriber (applications that receive messages) subscribe with their local communications middleware agent to desired topics. The communications middleware 28 abstracts the subscribing (receiving) applications and their locations from the publishing application. In other words, publishers have no knowledge of which applications, if any, have subscribed to their topics or their locations. Conversely, subscribers have no knowledge of the publisher's location, but unless it receives any messages on a desired topic, would know that some application somewhere is publishing on that topic.

According to one embodiment, originating applications 100 create outgoing message payloads for a topic (message type) and publish by passing to the communications middleware 28. The publishing application 100 defines a message type via a function call as is customary in the art. For inbound messages, receiving applications read inbound messages from the communications middleware layer.

For outbound messages, the communications middleware 28 identifies the subscribers to the published topic and identifies a communications/routing path (e.g. communications port or protocol driver) to each receiver. In this regard, the communications middleware includes a routing table mapping the applications to routing information. If receivers are on multiple, different communications paths, the middleware creates a duplicate message for each communications path. The communications middleware passes resulting messages to the domain interface layer.

For inbound messages, the communications middleware layer 28 passes the payload from inbound messages to the destination application, stripping off any remaining header information first.

Since different communications middleware solutions use different message headers and protocols, propagating the same protocol down to the domain separation software would generally require re-coding the domain separation software to match each middleware model. This would increase maintenance and logistics cost and complexity. Instead, according to one embodiment, the domain separation software uses a generalized, common messaging protocol internally. According to one embodiment, the domain interface layer 24 abstracts the interface between the communications middleware and the separation software by encapsulating a message generated according to a specific communications middleware protocol, into a container message adhering to a standard intermediate message format.

According to another embodiment, the domain interface layer 24 abstracts the interface between the communications middleware and the separation software by translating between the two message header formats and protocols. Either embodiment allows the domain separation software 20 to support multiple communication middleware solutions without re-coding. Although the translation embodiment requires writing a domain interface module 24 for each communications solution, one benefit of this approach is that by converting to a standard intermediate message format, two applications using different communications middleware solutions can directly communicate as the domain interfaces at each end of the connection effectively translate between the two communications middleware solutions.

For outbound messages, the domain interface layer 24 converts the routing and message type information in the communication middleware header to the message header format defined by the domain separation software protocol. According to one embodiment, the header from the communication middleware 28 is converted to a common header format which may include, for example, a sender application ID, receiver application ID, message type, message length, and routing path (communications port or protocol driver).

For inbound messages, the domain interface layer 24 converts the routing and message type information in the common domain separation software protocol into the local communications middleware format.

The domain gateway 22 receives outgoing messages from the domain interface 24 for its domain or directly from an application 100. Since most applications typically have limited trust, they generally cannot be trusted to accurately define the classification level of sent messages. That is, the application may misstate the security level, either accidentally or maliciously. In order to address this issue, the domain gateway 22 inserts classification level information into the header of outbound messages. According to one embodiment, the gateways insert a domain identifier (ID) into the outgoing message headers.

According to one embodiment, each domain in the system has a unique identifier. The applications belonging to a given domain can reside on any processor core in the system. The function of the domain gateway is to route messages to the correct destination. According to one embodiment, domain gateways 22 only route messages with the correct identifier for that domain; all other messages are logged and discarded.

The actual classification level for each domain is derived from the identifier. According to one embodiment, each domain gateway includes a table that identifies a legal send and receive pairs for each message type, along with routing information for each receiver. A valid message has an entry in this table. Any message that does not is deemed invalid and discarded.

According to one embodiment, multiple system domains may have the same classification level, but different identifiers—thus permitting separating data with the same base classification level (unclassified through top secret), but different need-to-know.

Domain identifiers—and hence classification level—are statically assigned to each domain during the build process. The gateway automatically inserts the domain identifier into the header of all messages sent by domain members. This permits the domain separator and intermediate gateways to recognize and discard misrouted messages with the wrong identifier (classification level), enforcing data separation.

For some operating system models, applications communicate with each other via dedicated connection objects. Since connections are dedicated, a receiving application can always derive which of many possible sending applications actually sent the message from the connection on which it was received. Other mechanisms conventional in the art for restricting inter-processor communications to authorized paths may also be employed in lieu of dedicated connection objects.

Before the domain gateway 22 delivers an inbound message to a receiver (e.g. an application, domain separator, or domain guard), the domain gateway reads the domain identifier from the message header and compares it to the local domain identifier. Messages with the correct identifier are delivered to the addressed receiver; incorrectly labeled messages are discarded and reported.

A primary function of the domain separator 20 is maintaining data separation on shared, MLS data links to external devices. According to one embodiment, the separator does not insert any information into messages headers, but instead, verifies that the correctness of the message header, such as, for example, the correctness of the domain identifier.

According to one embodiment, the domain separator has an internal table defined at build time that maps domain identifiers to domain gateways. Messages received from a domain gateway with incorrect identifiers are discarded and reported. Correctly labeled messages are encrypted and signed with an encryption, signature key pair which may be indexed, for example, by the domain identifier. The messages are then passed to the protocol interface layer for routing to the correct external interface. According to one embodiment, the domain separator 20 encrypts the payload of a message without encrypting the header. However, the entire message, including header, is signed with the signature key.

For inbound messages, the domain separator 20 uses the domain identifier to index the decryption, verification key pair (the same keys used to encrypt and sign). The domain separator first verifies the digital signature. If the signature is invalid, the message is discarded and reported. If the signature is valid, the message is decrypted and passed to the gateway identified by the domain identifier.

According to one embodiment, the protocol interface layer 26 contains an embedded, static routing table that maps the routing information in message headers to communications ports or protocol drivers. The protocol interface layer passes outbound messages received from the domain separator 20 to the protocol driver or communications port selected from the routing table by the information in the message header. For multi- or broadcast messages, the protocol interface sends the same message to multiple ports or drivers.

For inbound messages, the protocol interface layer routes messages received from all protocol drivers or communications ports to the destinations defined in the routing table and message header. The protocol interface layer can pass messages to the domain separator, another local communications port/protocol driver, or both (in the case of multi- or broadcast messages).

According to one embodiment, the software architecture according to the various embodiments of the present invention not only extends MILS data separation across processors, but it also acts as a reference monitor between applications. Traditional secure operating systems separate data by authenticating users (using techniques such as passwords or biometrics), using their verified identify to assign their access rights (privileges), and allowing users to only access data for which they have access rights. Separation between data at different classification levels is usually enforced by storing the data on different media or different systems/networks. Data at the same level, but different type (need to know), is usually stored on the same media, but in different directories. A secure OS allows/denies access to media/directories by matching user privileges to the classification/type assigned to each media and directory, based on a system security policy. The security policy is defined by mapping user privileges to the data they can access. A secure OS thus enforces who can reference classified data, hence the name of the reference monitor.

Separation kernels, on the other hand, do not generally consider the classification/type when separating data. Instead, SKs generally support a security policy that defines which software (applications) can access which system resources—usually memory. Separation kernels are thus data agnostic, in the sense that they do not know or care about the classification of data stored within an address space; only what resources that address space can access. As a result, in the traditional SK model, if two applications are allowed to exchange data, the SK does no verification or place any restrictions on what data can be exchanged. In effect, a traditional SK can only enforce security policies at the connection, not individual data message, level. Some consider this lack of granularity a weakness in the traditional SK model.

The software architecture according to embodiments of the present invention provide an enhancement to the traditional SK model by having the domain gateways and separators verify the routing of individual messages. In this regard, the domain gateways and separators act as a traditional reference monitor that verifies and enforces restrictions on inter-application message traffic. This makes the software architecture a hybrid between a traditional secure OS and a MILS SK that combines the modular, simplified data separation provided by a SK with a reference monitor and extends both across multi-processors.

Figure 4:
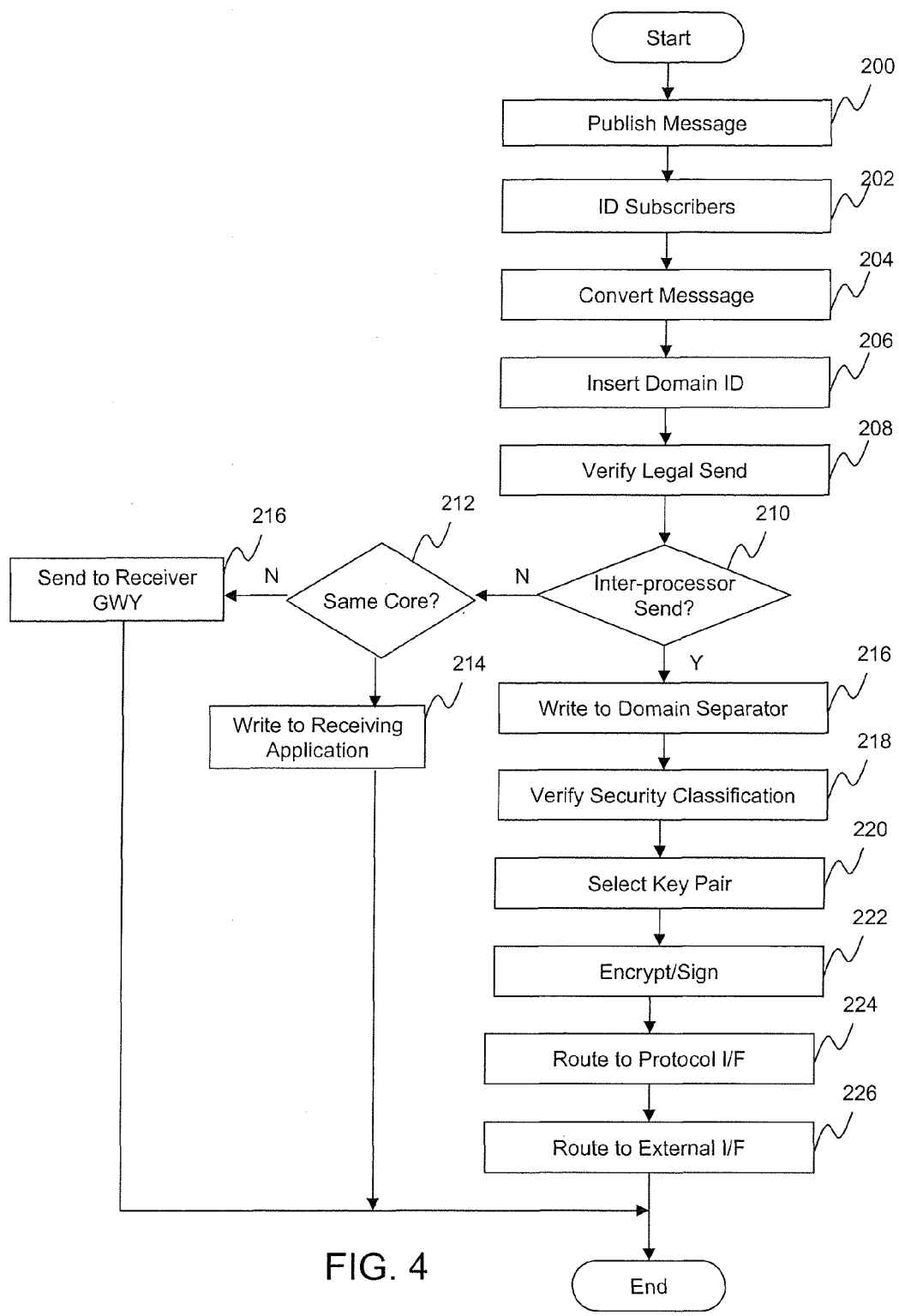
FIG. 4 is a flow diagram of a process for transmitting outgoing messages from a sending application to a receiving application according to one embodiment of the invention.

FIG. 4 is a flow diagram of a process for transmitting outgoing messages from a sending application to a receiving application according to one embodiment of the invention. A sending application generates a message having a payload for a particular message type and in step 200, publishes the message by sending it to communications middleware 28.

In step 202, the communications middleware 28 identifies the subscribers for each message type and further identifies the communications path to each receiving application. The communications middleware 28 inserts the routing path to the message header and forwards it to the domain interface 24.

In step 204, the domain interface 24 receives the message with the routing and type information and converts the communication middleware header to a uniform message header format defined by the domain separation software protocol. According to one embodiment, the uniform message header includes a sender application ID, receiver application ID, message type, message length, and routing path (e.g. communications port or protocol driver). According to one embodiment, both the sender and receiver IDs identify the virtual address space where the corresponding application resides. Typically, there is a one to one mapping between application and virtual address space. However, it is possible for a single virtual address space to contain multiple applications. In the latter case, all applications in the virtual address space have the same ID. Since each virtual address space has its own domain I/F instantiation and each instantiation is assigned a unique ID, it is responsible for inserting the sender ID. According to one embodiment, the domain I/F is also responsible for translating the subscriber information provided by the communications middleware to one or more receiver IDs.

The converted message is transmitted to the domain gateway for the domain in the core. In step 206, the domain gateway inserts a unique domain ID identifying its domain into the message header.

In step 208, the domain gateway 22 determines whether the sender application is allowed to send a message of the identified type and security classification (based on the domain ID) to the receiving application. In this regard, the domain gateway 22 accesses a table with information of identifying legal sending and receiving application pairs for each message type. At a minimum, two applications must be in the same domain, and hence, the same classification level, in order to be listed as a valid sending and receiving application pair. In this manner, the software architecture according to the various embodiments of the acts as a reference monitor between applications. In other words, by verifying routing information associated with the message, it enforces a system security policy that defines what data applications can exchange, not just which applications can exchange data. This makes the architecture a hybrid between a pure MILS architecture and a traditional secure OS. This mitigates one of the key concerns associated with separation kernels and the MILS architecture—separation kernels restrict which applications can exchange data, but do not restrict nor monitor the data exchanged between connected applications. The software architecture according to the various embodiment of the present invention does enforce restrictions on the data exchanged between applications.

In step 210, a determination is made by the domain gateway 22 whether this is an inter-processor transmission. If the answer is NO, the transmission is an intra-processor transmission in the same core or in a different core of the same processor. If the receiving application is in the same core, as is determined in step 212, the same gateway instantiation writes the message to the receiving application via its domain interface 24 and communications middleware 28. If the receiving application is in a different core, the gateway instantiation connected to the sending application passes the message, in step 216, to the gateway instantiation residing on the same core as the receiving application, which then writes the message to the receiving application.

Referring again to step 210, if the communication is an inter-processor transmission, the gateway instantiation connected to the sending application passes the message to the domain separator 20 in step 216.

In step 218, the domain separator 20 retrieves its internal table with information mapping domain identifiers to domain gateways and verifies whether the inserted domain identifier, and hence, security classification, indeed corresponds to the domain gateway from which the message was received. If the security classification assigned to the message by virtue of the domain ID cannot be verified, the message is discarded in step 228. Otherwise, the classification is verified, and in step 220, the domain separator 20 retrieves an encryption, signature key pair from the cryptographic library 30 based on the identified domain ID/security classification.

In step 222, the domain separator 20 encrypts at least a portion of the message, such as, for example, the payload data, and further signs the entire message including the domain ID with the signature key.

In step 224, the domain separator 20 forwards the message to the protocol interface 26 which in turn passes it to the protocol driver of communication port selected from the routing table based on the information in the message header.

In step 226, the protocol interface 26 routes the message to an external interface such as, for example, the data communications bus 12.

Figure 5:
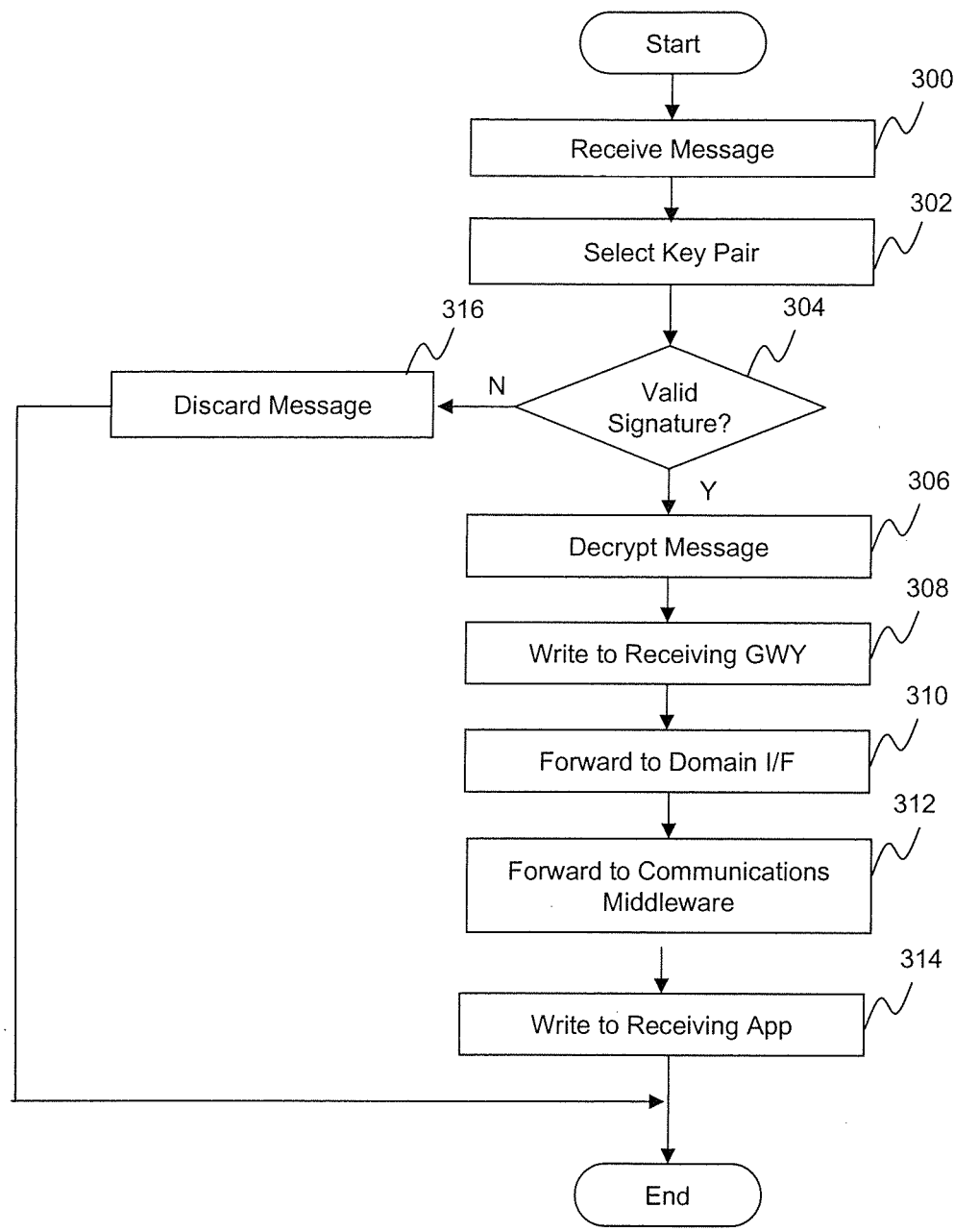
FIG. 5 is a flow diagram of a process for receiving an incoming message sent by a sending application to a receiving application according to one embodiment of the invention.

FIG. 5 is a flow diagram of a process for receiving an incoming message sent by a sending application to a receiving application according to one embodiment of the invention. In step 300, the domain separator 20 receives the incoming message and in step 302, selects an encryption, signature key pair from the cryptographic library 30 based on the domain identifier.

In step 304, the domain separator 20 determines whether the signature is valid based on the retrieved signature key. If the signature is not valid, the message is discarded and reported in step 316. Otherwise, if the signature is valid, the message is decrypted in step 306 via the retrieved decryption key.

In step 308, the message is written to the domain gateway 22 identified by the domain identifier. The domain gateway 22 receives the incoming message and reads the domain identifier from the message header and compares it to the local domain identifier. If the identifiers do not match, the message is discarded and reported.

If the domain identifiers match, the domain gateway proceeds forward the message to the appropriate domain interface 24. The domain interface converts the routing and message type information in the common domain separation software protocol into the local communications middleware format.

In step 312, the converted message is forwarded to the communications middleware 28. The communications middleware passes the payload portion of the message and writes it to the receiving application in step 314, stripping off any remaining header information first. The receiving application processes the message and generates an output in response to the message. For example, the message may be a command to invoke a sensor application to scan a particular geographic area.

Although this invention has been described in certain specific embodiments, those skilled in the art will have no difficulty devising variations to the described embodiment which in no way depart from the scope and spirit of the present invention. Furthermore, to those skilled in the various arts, the invention itself herein will suggest solutions to other tasks and adaptations for other applications. It is the applicants intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A data processing apparatus adapted for transmitting messages classified at different security classification levels while maintaining data separation of the messages, the data processing apparatus comprising:
   a first processor having a first memory, the first processor being associated with a first domain operating at a particular security classification level, the first domain being identified via a domain identifier;
   a second processor having a second memory; and
   a communication bus coupled in-between the first processor and the second processor,
   wherein, the first memory includes program instructions, the first processor being operable to execute the program instructions, the program instructions including:
      receiving a message from a first application in the first processor intended for a second application in the second processor;
      tagging the domain identifier to the message;
      receiving the message with the tagged domain identifier;
      identifying a first domain gateway from which the message is received;
      verifying accuracy of the tagged domain identifier based the identification of the first domain gateway from which the message is received;
      selecting an encryption key based on the domain identifier;
      encrypting at least a portion of the message based on the selected encryption key; and
      routing the encrypted message to the second processor via the communication bus, wherein the second application in the second processor generates an output in response to the message.

2. The data processing apparatus of claim 1, wherein the second processor is associated with a second domain operating at a different security classification level, wherein each of the first and second domains is associated with specific virtual address spaces in the memory of the corresponding processor.

3. The data processing apparatus of claim 2, wherein the program instructions further include preventing communication between virtual address spaces associated with different domains within the first processor, wherein the program instructions further include forwarding the message to the first domain gateway module for the first domain operating at the particular security classification level.

4. The data processor apparatus of claim 1, wherein the program instructions for selecting of the encryption key and the encrypting of at least a portion of the message are associated with a first domain separator module in the first processor, wherein a single domain separator module exists for each of the first and second processors.

5. The data processing apparatus of claim 4, wherein the program instructions further comprise:
   determining that the second application is in the second processor; and
   forwarding the message to the first domain separator module.

6. The data processing apparatus of claim 1 further comprising a data store storing a table mapping domain identifiers to domain gateways, the program instructions further including:
   discarding the message if the tagged domain identifier does not match the domain identifier in the table for the first domain gateway from which the message is received.

7. The data processing apparatus of claim 4, wherein the message includes a header generated according to a first protocol associated with a specific communication middleware program, and the first memory includes program instructions including converting the header to a common header generated according to a common messaging protocol associated with the first domain separator module.

8. The data processing apparatus of claim 1, wherein the message includes a message type, and the program instructions include broadcasting the message to subscribers of the message type.

9. The data processing apparatus of claim 1, wherein the security classification level is selected from a group consisting of unclassified, secret, confidential, and top secret.

10. The data processing apparatus of claim 1, wherein the second memory in the second processor includes program instructions stored therein, the second processor being operable to execute the program instructions, the program instructions including:
receiving the encrypted message;
retrieving the tagged domain identifier from the message;
selecting a decryption key based on the retrieved domain identifier;
decrypting the message based on the decryption key; and
forwarding the message to the second application.

11. The data processing apparatus of claim 1, wherein the message is routed to the second application while maintaining data separation with a second message also transmitted via the communication bus, wherein the second message is classified at a security classification level different from the particular security classification level.

12. The data processing apparatus of claim 1 wherein the first program instructions further include:
verifying routing information associated with the message for enforcing restrictions on data exchanged between the first and second applications.

13. The data processing apparatus of claim 1, wherein the two applications operate according to a same security classification level.

14. A non-transitory computer readable medium embodying program instructions for execution by a data processing apparatus including a first processor and a second processor, the program instructions adapting the data processing apparatus for transmitting messages classified at different security classification levels while maintaining data separation of the messages, the program instructions comprising:
receiving from a first application in the first processor a message intended for a second application in the second processor, wherein the first processor is associated with a first domain operating at a particular security classification level, the first domain being identified via a domain identifier;
tagging the domain identifier to the message;
receiving the message with the tagged domain identifier;
identifying a first domain gateway from which the message is received;
verifying accuracy of the tagged domain identifier based the identification of the first domain gateway from which the message is received;
selecting an encryption key based on the domain identifier;
encrypting at least a portion of the message based on the selected encryption key; and
routing the encrypted message to the second processor via a communication bus, wherein the second application in the second processor generates an output in response to the message.

15. The non-transitory computer readable medium of claim 14, wherein the message is routed to the second application while maintaining data separation with a second message also transmitted via the communication bus, wherein the second message is classified at a security classification level different from the particular security classification level.

16. A method for transmitting messages classified at different security classification levels while maintaining data separation of the messages, the program instructions comprising:
receiving from a first application in a first processor a message intended for a second application in a second processor, wherein the first processor is associated with a first domain operating at a particular security classification level, the first domain being identified via a domain identifier, wherein the first and second processors are included in a data processing apparatus;
tagging the domain identifier to the message;
receiving the message with the tagged domain identifier;
identifying the first domain gateway from which the message is received;
verifying accuracy of the tagged domain identifier based the identification of the first domain gateway from which the message is received;
selecting an encryption key based on the domain identifier;
encrypting at least a portion of the message based on the selected encryption key; and
routing the encrypted message to the second processor via a communication bus, wherein the second application in the second processor generates an output in response to the message.

17. The method of claim 16, wherein the message is routed to the second application while maintaining data separation with a second message also transmitted via the communication bus, wherein the second message is classified at a security classification level different from the particular security classification level.

* * * * *